United States Patent Office 3,197,526
Patented July 27, 1965

3,197,526
PREMIX STABILIZED POLYESTER MOLDING COMPOSITIONS CONTAINING SULFUR AND A SUBSTITUTED ARYL HYDROXIDE
Arthur M. Howald, Perrysburg, Ohio, assignor, by mesne assignments, to American Cyanamid Company, Wayne, N.J., a corporation of Maine
No Drawing. Filed Apr. 3, 1961, Ser. No. 100,028
11 Claims. (Cl. 260—866)

This invention relates to a molding composition containing a polymerizable unsaturated polyester resin and a combination of stabilizers. More particularly, the invention concerns a premix plastic molding composition comprising a polymerizable unsaturated polyester resin, a monomeric substance copolymerizable therewith, a polymerization catalyst, fillers and/or reinforcement materials, and a combination of two stabilizers, sulphur and an aryl compound with at least one hydroxyl group thereon.

Polyesters which are commercially available may be defined as polycondensation products of dicarboxylic acids with polyhydric alcohols. These polycondensation products or polyesters achieved great commerical importance in the last two decades. Today, they are recognized as commercially important resinous materials. Saturated, heat-hardenable polyester resins, such as glyceryl phthalate, harden by esterification with elimination of volatiles, e.g. water. The saturated polyesters are of value for plasticizers, fibers, films, and polyurethane production. However, where molding applications are involved, polymerizable unsaturated polyester resins are of greater value. One of the important advantages of the polymerizable unsaturated polyester resins for molding applications is that in curing the unsaturated resin hardens by polymerization without substantial evolution of volatiles. In general, the unsaturated polyester resins are produced by reacting a dihydric alcohol and a dibasic acid, at least one of which contains a double bonded pair of carbon atoms. Under suitable conditions, the alcohol and acid react to split out water and form ester linkages. The unsaturated polyester, thus formed, contains double bonds which render the material capable of cross linkages. A composition including the unsaturated polyester resin and a suitable copolymerizable monomer, under the influence of a suitable catalyst, will undergo addition polymerization. Cross-linking occurs to form a product which, when fully cured, is insoluble and infusible. Illustrative of teachings of unsaturated polyester resins, monomeric substances copolymerizable therewith, and compositions containing both, there are, to mention only a few, U.S. Patents Nos. 2,443,735 to 2,443,741, and 2,491,409.

A convenient form for commercial employment of the unsaturated polyester resin in many applications is that of a premix molding composition. In general, a premix molding composition comprises the unsaturated polyester resin, a monomeric substance copolymerizable therewith, and a suitable polymerization catalyst. Numerous parts with varied wall thicknesses, intricate contours and molded-in inserts can be molded rapidly from these premix compositions. Many of such parts can be molded only with difficulty, if at all, from available materials other than such a premix composition. Premix unsaturated polyester compositions have been used to mold electrical equipment parts, refrigerator striker plates, automotive heater ducts, air conditioning parts, and garnish moldings, as window frames, and the like. Both compression and transfer methods of molding have been used to mold the premix composition. A principal feature of the molding is a rapid closing of the mold, as otherwise a pre-gelling of the composition may result. In one customary method of molding a ram jet extruder is used to force a premix plastic unsaturated polyester molding composition at a pressure of from 500 to 2500 p.s.i. into a heated mold cavity where the composition is cured at a temperature of about 270–300° F. for anywhere from about ¼ to 5 minutes.

One of the problems encountered in the preparation of a satisfactory premix polyester molding composition is that, almost immediately after addition of the polymerization catalyst to the composition, polymerization commences. Although in commerical molding practice polymerization generally is carried out at an elevated temperature in the presence of a catalyst in order to cause a rapid polymerization, polymerization does proceed slowly at room temperatures. The rate of polymerization at room temperatures, after incorporation of the polymerization catalyst, although rather slow, is rapid enough that generally in a few days the composition becomes a substantially infusible worthless mass that cannot be formed into any useful product. One manner of overcoming this difficulty has been to mix the catalyst in the composition and then mold almost immediately. Another manner of overcoming this difficulty, and a more convenient solution of a problem, has been to include in the premix polyester molding composition an additive to stabilize the composition prior to molding. The molding of premix compositions containing additives for stabilization can be postponed for sometime. Thus, a resin manufacturer can prepare and ship to the molders a ready-to-mold stabilized premix composition which will remain in a moldable state for a period of time. An important requisite for a commercially satsfactory premix polyester molding composition has been the presence in the composition of a substance making the composition relatively stable for an extended period of time at room temperature and under ordinary storage and handling conditions. Another important requisite for a satisfactory premix molding composition is that any such material or substance which is added to the composition to impart stability prior to molding, should not interfere with the cure during molding and should not be detrimental to any appreciable extent to the properties of the molded cured product.

In the polyester molding art the term "stabilizer" has come to mean an additive which is effective prior to molding but which is without appreciable effect upon the normal elevated temperature polymerization of catalyzed polyester compositions. A stabilizer differs from an inhibitor primarily in that the inhibitor is an additive to such compositions which inhibits and/or prevents polymerization not only at temperatures and conditions prior to molding but also at molding conditions to an appreciable extent. Thus, the ordinary inhibitor, while effective in providing a stabilized premixed polyester molding composition, is detrimental to the polymerization during molding.

Just as polyesters and premix unsaturated polyester molding compositions are well known to the art, a large number of substances which function as stabilizers also have become well known. For example, as illustrative of the recognition of the importance of stabilizers for polyester compositions, there are, to mention only a few, U.S. Patents Nos. 2,532,475, 2,559,837, 2,559,838, 2,607,-756, 2,610,168, 2,632,753, 2,635,089, and 2,632,751.

Some known stabilizers, by themselves, provide stabilization of a polyester molding composition. Other known stabilizers are effective only in the presence of oxygen. Combinations of oxygen and one of the latter stabilizing substances, can be effective only when the molding compound is in a physical form which enables substantial contact with oxygen of the air. Physical forms of the molding composition, so stabilized, which enabled contact with the oxygen of the air, have included sheets, rods or ribbons, granules, powders, and the like, in which extremely limited thicknesses of less than ¼″ maximum dimension in at least one direction were necessary. Thicker masses of molding composition could not be handled and stored for any appreciable period of time, when using stabilizing substances only effective in the presence of oxygen, but had to be molded within a few days after catalyst addition to the composition.

The present invention is based upon the discovery that in a premix unsaturated polyester molding composition the presence of a combination of sulphur and another stabilizing substance produces a novel stabilizing effect. The combination of sulphur and the other stabilizing substance greatly retards polymerization of the molding composition at room temperatures and under other conditions prior to molding, and does so without appreciable effect and impairment of the cure at normal curing temperatures and under normal molding conditions and without appreciable impairment of the quality of the molded product. The novel stabilizing effect produced by the sulphur and the other stabilizing substance is a combined effect and is greater than that produced by either alone in amounts substantially equivalent of the total amount of both. The invention is important in that stabilizing substances, hitherto only useful in the presence of oxygen, are now of great utility whether oxygen is or is not present. Stabilizing substances, hitherto only useful in the presence of oxygen and only in physical forms of the molding composition not exceeding about ¼″ in maximum thickness when employed in combination with sulphur are useful to provide masses of the molding composition greater than ¼″ in thickness. This discovery is of commercial importance in that heretofore such thicker masses could not be satisfactorily stabilized with those stabilizing substances only effective in the presence of oxygen. Thus, unless a stabilizer not requiring the presence of oxygen was used, such massive forms of the molding composition could not be produced and satisfactorily stored and handled for any appreciable period of time before molding.

It is, therefore, an object of the invention to provide a new stabilized polyester molding composition.

It is another object of the invention to provide a polymerizable polyester molding composition containing a new combination of stabilizers.

It is a further object of the invention to provide a premix stabilized polyester molding composition in a physical form in which every dimension is greater than ¼″.

It is an additional object to provide a premix plastic stabilized unsaturated polyester molding composition containing a stabilizer combination which enables masses of the molding composition of thicknesses greater than ¼ inch to remain in a moldable state for extended period of time.

Other objects and advantages will be apparent from the description which follows, which is intended only to illustrate and disclose, but in no way to limit the invention.

As far as is known, a stabilizer combination of the invention is useful with any known premix molding composition comprising an unsaturated polyester resin and a polymerization catalyst. In such premix molding compositions the stabilizer combination of the invention alone without the necessity of other stabilizers being present provides a molding composition of satisfactory stability. If desired though, the stabilizer combination may be employed along with other stabilizers conventionally used in such molding compositions. Numerous premix polyester molding compositions are known to the art. The patents already mentioned disclose a large number of premix molding compositions containing an unsaturated polyester resin and a polymerization catalyst. In addition, to mention only a few, molding compositions are disclosed in United States Patents Nos. 2,549,732, 2,624,714, 2,738,551, 2,701,054, 2,978,834, and in many other patents and publications well known to the art.

A premix stabilized polyester molding composition of the invention comprises from about 65 to about 95 parts [1] of an unsaturated polyester resin, from about 5 to about 35 parts of a monomeric substance copolymerizable therewith, a suitable polymerization catalyst in an amount of from about 0.5 to about 5% of the unsaturated polyester resin, and the stabilizer combination of the invention in an amount of about 0.01 to about 0.6% of the unsaturated polyester resin. Other materials, such as fillers, reinforcement materials, pigments, plasticizers, lubricants, colorants, and the like, may be included in the premix molding composition and generally are present in various amounts dependent on the particular purpose for which the materials are employed.

A preferred molding composition of the invention is a premix, plastic or putty-like, molding composition comprising from about 70 to about 90 parts of an unsaturated polyester resin, from about 10 to 30 parts of a monomeric vinyl substance copolymerizable therewith, an organic peroxide polymerization catalyst in an amount of from about 1 to about 4 percent of the unsaturated polyester resin, and a stabilizer combination of the invention in an amount of from about 0.01 to about 0.6 percent of the unsaturated polyester resin.

The term "plastic" is used herein in its usual sense, namely to refer to a non-elastic pliable material, which, when deformed, tends to retain its deformed shape. Plastic molding compositions have also been called "putty" type molding compounds. They are of an extrudable nature and can be forced, at temperatures below normal molding temperatures, through an orifice and into the mold cavity where they are cured. These plastic molding compositions are made by blending a relatively viscous, liquid, polymerizable unsaturated polyester resin with various fillers, usually a mixture of fibrous fillers and non-abrasive inorganic fillers. Preferred fibrous fillers are asbestos and glass fibers. Preferred non-abrasive fillers are calcium carbonate and kaolin, usually ground to 100 mesh, U.S. Sieve Series, or finer. Plastic molding compounds are obtained when polyester resins are mixed with fillers in certain ranges of proportions. At lower ratios of polyester resin to filler, only a fragile, non-plastic mixture can be made. Such a mixture ruptures when subjected to slight pressure but does not deform. At higher ratios of resin to filler, although a sticky somewhat plastic mass may be obtained, the resulting composition is of little commercial value for molding. In packaging and handling, portions of such a sticky mass tend to coalesce and to form just one large plastic mass, which is difficult to handle and to employ in molding operations. As a general rule, premix plastic unsaturated polyester molding compositions comprise filler and resin in proportions from 1 to 10 percent less than a certain filler to resin ratio, which certain ratio is the maximum at which the molding composition can consist and remain in an integral deformable mass without the mass rupturing when subjected to slight pressure. The plastic molding compositions of U.S. Patent No. 2,549,732, comprising a polyester resin filled with amphibole asbestos and Georgia clay can be stabilized with a composition according to the instant invention.

Commercially, premix plastic molding compositions comprising an unsaturated polyester resin, fillers, a polymerization catalyst, and a stabilizer, are prepared as extruded forms which are shipped in various lengths or sections to the molder. A molder then cuts accurate weight charges based on the length or the size of the extruded product and feed such charges to a press in essentially the same manner in which preforms are employed in the

[1] The terms "percent" and "parts" are used herein, and in the appended claims, to refer to percent and parts by weight, unless otherwise indicated.

usual compression and transfer molding methods. In the trade, extruded cross sections exceeding about 1¼" in thickness generally are called "logs" and smaller extruded cross-sections are called "ropes" or rope form of molding compound. Sections and lengths of rope of such premix molding composition usually are shipped in a coiled form on mandrels, or in packages of the type disclosed in U.S. Patent No. 2,701,054. The "logs" usually are packaged and shipped in a variety of lengths with usually several lengths or more to a package. Extruded cross sections of a thickness of ¼" or less are rarely produced and shipped. For example, one commercial supplier today sells only extruded ropes and logs ranging from ½" to about 2½" or more in diameter. In the commercially available logs and ropes those stabilizing substances active only in the presence of oxygen are ineffective, as explained earlier. An important advantage of the present invention is that it is now possible to employ stabilizing substances, formerly only active in the presence of oxygen, in such commercially available extruded sizes.

The stabilizer combination employed in the invention consists of two substances, sulphur and a stabilizing substance which can be any of those previously known, and preferably is one which is active in the presence of oxygen. The two substances together exert an unexpectedly great combined stabilizing effect on the premix molding composition. In co-pending application Serial No. 622,-260, filed November 15, 1956, now Patent No. 2,978,434, sulphur is disclosed and claimed as a stabilizer for polyester molding compositions. Stabilizing substances active only in the presence of oxygen are known and include arylhydroxide stabilizing substances disclosed in United States Patents 2,632,751, 2,532,475, 2,607,756, and other patents and publications.

More particularly, stabilizing substances active in the presence of oxygen include those nuclearly substituted arylhydroxides having at least one hydroxyl group and in which the nuclear arylhydroxide is selected from the class of substituted mono-hydroxy and poly-hydroxy benzenes, naphthalenes, pyrenes, anthracenes, and phananthracenes, which have at least one nuclear substituent other than nuclear hydroxyl substituents. The nuclear substituents other than hydroxyl must include at least one that consists at least in part of a monovalent hydrocarbon radical selected from the group consisting of alkyl, alkenyl, aryl, alkaryl and aralkyl, and may include others selected from the group consisting of halogen atoms of atomic weight greater than 35, amino radicals, acyl radicals, and monovalent aldehyde groups. Further details and requirements of substances comprising this class of arylhydroxide stabilizers are found in United States Patent No. 2,632,751. When the arylhydroxide nucleus is a naphthol, N-aryl carbamyl substitution on the 3-position of the naphthol nucleus is permissible, with the aryl portion of this substituent selected from a group consisting of phenyl, naphthyl, and nuclear substituted phenyl and naphthyl radicals. In such N-aryl carbamyl substituted naphthols, the other nuclear substituent may include any of the previously mentioned substituents for the arylhydroxide nucleus and also the carboxyl and sulfo radicals. Further details and requirements on substances comprising this class of arylhydroxide stabilizers are found in United States Patent No. 2,532,475. When the arylhydroxide nucleus is naphthol, also there may be an arylazo substituent on the 1-position of the naphthol nucleus, with the arylazo substituent selected from the group consisting of phenylazo, naphthylazo, and nuclear substituted phenylazo naphthylazo radicals, if there be a nuclear sulfo substituent for the naphthol or arylazo nucleus. With such 1-arylazo-naphthol sulphonic acids, the other nuclear substituents may include any of the foregoing recited nuclear substituents and the carbamyl and isonitroso radicals. In addition, when the foregoing arylhydroxide stabilizers include on one of the aryl nuclei in their structure a sulfo or carboxyl nuclear substituent, the alkaline earth metal salts of such arylhydroxide containing acidic functional groups are also useful stabilizing substances effective only in the presence of oxygen. Of these salts, the calcium salt is preferred. Further details and requirements for substances making up this class of aryl hydroxide stabilizers are found in United States Patent No. 2,607,756. In addition to the above described aryl compounds with at least one hydroxyl group thereon, any other nuclearly substituted aryl compound with at least one hydroxyl group thereon that is an effective stabilizer in the presence of oxygen may be employed with sulphur to make up the stabilizer combination employed in the invention.

Illustrative, but not intended to be a complete listing, of aryl compounds with at least one hydroxyl group thereon that are effective stabilizers only in the presence of oxygen, are the following stabilizing substances, any of which with sulphur may make up a stabilizer combination for a premix composition of the invention: guaiacol; benzene azoresorcinol; beta-methylumbelliferone; o-cresol; m-cresol; p-cresol; tertiary butyl p-cresol; 2,6-di-tertiary-butyl-14 methylphenol; orcinol; 2-chloro-5-hydroxy toluene; 2-amino-5-hydroxy toluene hydrochloride; monomethylether of hydroquinone; vanillyl alcohol; vanillan; eugenol; p-hydroxy diphenyl; p-benzyl phenol; monobenzyl ether of hydroquinone; N-p-tolyl 2-hydroxy-3-naphthamide; N - phenyl-2-hydroxy-3-naphthamide; 1-(4-sulfonaphthylazo)-2-naphthol; 1-(4-sulfophenylazo)-2-naphthol; 1-(p-tolylazo) - 2 - naphthol-3,6-disulfonic acid; and the dicalcium salt of 1-(4-methyl-2-sulfophenylazo)-2-hydroxy-3-naphtholic acid).

The amount or proportion of the stabilizer combination employed in a premix stabilized polyester molding composition of the invention must be large enough to provide stability for the premix composition at room temperature and storage conditions for that period of time expected to be encountered after preparation thereof until molding takes place. This amount or proportion thus may vary widely, as the desired period of time for stability may vary considerably. Minimum stabilities for periods of two months or longer generally are desirable and are sufficient for most purposes, although stabilities upwards to one year sometimes are desired. At least enough of the stabilizer combination should be employed to provide stability for two months. The amount of the stabilizer combination employed, based on the weight of the unsaturated polyester resin contained in the composition, generally ranges from about 0.01 to about 0.6 percent, although these amounts may vary somewhat depending on the particular arylhydroxide employed. Amounts larger than about 0.6 percent generally are undesirable, as in such quantities the stabilizer combination tends to inhibit and retard the cure at normal molding temperatures and conditions. With sulphur and certain arylhydroxides the minimum amount of the stabilizer combination necessary to provide stability for two months may be somewhat higher than about 0.01 percent and the maximum useful amount may also be higher. For example, with sulphur and N-phenyl-2-hydroxy-3-naphthamide or N-tolyl-2-hydroxy-3-napthamide the maximum quantity of the stabilizer combination should not exceed about 0.7 percent and a minimum amount should be not less than about 0.1 percent. It is preferred that the stabilizer combination be employed in amounts from 0.05 to 0.3 percent of the unsaturated polyester resin. It is most preferred that there be employed at least about 0.1 percent of the stabilizer combination. The ratio of sulphur to the arlhydroxide may vary considerably with ratios of from 1 to 100 parts of sulphur for each 10 parts of arylhydroxide stabilizer generally useful. Preferably the ratio of sulphur to arylhydroxide stabilizer is within the range of ½ to 1½ parts of sulphur for each part of arylhydroxide stabilizer, with it being most preferred that about equal amounts of sulphur and arylhydroxide stabilizer be employed.

The following examples are presented solely for the purpose of further illustrating and disclosing the invention, and are not to be construed as limitations thereon. Hardness values reported in these examples were made with a standard piece of testing equipment known under the trade designation as "Barcol Impressor."

*Example I*

A solution was prepared from 0.075 part of powdered sulphur, 0.075 part of ditertiary butyl p-cresol, 10 parts of diallyl phthalate monomer, 1 part of lauryl acid peroxide and 1 part of tertiary butyl perbenzoate. The resulting solution was then mixed with a polymerizable composition composed of 10 parts of diallyl phthalate monomer and 80 parts of dipropylene glycol maleate and the resulting mixture mixed with 400 grams of ground limestone of minus 200 mesh, U.S. Sieve Series. The resulting product was a premix plastic stabilized polyester molding composition. Small balls, about 1" to 1½" in diameter, of this premix composition, after heating at 120° F. for more than 20 days, had not gelled, as a knife blade could be pushed manually therein and satisfactory moldings were made therefrom. Hardness reading for a cured molding after a 3 minute cure at about 300° F. was 67 on the "Barcol" scale. In comparison, moldings made from freshly prepared like compositions, except that they contained no stabilizer or conventional stabilizers, and using 2 to 3 minute cures at about 300° F. had hardnesses of from 67 to 73 on the "Barcol" scale. These molding tests and hardness values illustrate that the stabilizer combination of the invention exerted little or no detrimental effect on the molding conditions and resulting molded product. All of the preceding "Barcol" hardness values were substantially the same, being within the limits of experimental error.

When a premixed composition was prepared as above, except that the sulphur and the ditertiary butyl p-cresol were omitted, the unstabilized composition gelled after less than 16 hours at 120° F. to such an extent that a knife blade could not be pressed manually therein and no molding could be produced therefrom. Another premix composition, prepared as described above except that the powdered sulphur was omitted, gelled within less than 55 hours at 120° F. to such an extent that a knife blade could not be pushed manually therein and no molding could be produced therefrom. Still another premix composition, prepared as above except that the ditertiary butyl p-cresol was omitted, gelled within about three days at 120° F. to such an extent that a knife blade could not be pushed manually therein and no molding could be produced therefrom.

*Example II*

Premix stabilized polyester molding compositions with the stabilizer combination of Example I were prepared as in Example I, except that the 1 part of tertiary butyl perbenzoate was omitted and there were employed 2 parts of lauryl acid peroxide. Like compositions also were prepared, except that the stabilizer combination consisted of powdered sulphur and ditertiary butyl p-cresol in an amount of 0.15 part of each. These premix compositions were stable for 60 and 90 minutes respectively, at 180° F. and 75 and 135 minutes, respectively, at 170° F. at which times it was possible to push a toothpick through small about 1 inch diameter balls of these compositions.

In contrast, like premix compositions containing 0.075, 0.15 and 0.3 part of powdered sulphur, after 40, 55, and 80 minutes, respectively, at 180° F. and 45, 70, and 120, minutes, respectively, at 170° F. had gelled to such an extent that it was not possible to push a toothpick through small about 1 inch diameter balls thereof. Like premix compositions containing only ditertiary butyl p-cresol in the amounts of 0.075, 0.15, and 0.30 part, after 35, 45, and 50 minutes, respectively, at 180° F. and 40, 60, and 65, minutes, respectively at 170° F. had gelled to such an extent that it was not possible to push a toothpick through small about 1 inch diameter balls thereof.

*Example III*

A premix stabilized polyester composition was prepared as in Example I except that 0.075 part of guaiacol replaced the 0.075 part of tertiary butyl p-cresol. Small portions of this premixed stabilized polyester molding composition in masses of more than ¼" in thickness were stable at 180° F. for over 90 minutes. After the exposure at 180° F. for 90 minutes these masses were found not to contain any hard, preset lumps or stones; a knife blade could be pushed manually therethrough; and satisfactory moldings at normal molding conditions were prepared therefrom. The "Barcol" hardness of moldings having 20 second and 60 second cures at about 300° F. were 71 for each.

In contrast thereto, masses of more than ¼" thickness of like compositions except that the stabilizer combination of the invention was replaced by 0.075 part and 0.15 part respectively of guaiacol, after less than about 45 minutes at 180° F., had gelled to such an extent that a knife blade could not be pushed manually therethrough and moldings could not be made therefrom. Masses of more than ¼" in thickness of like compositions except that 0.075 and 0.15 part of sulphur replaced the stabilizer combination of the invention, after less than 55 minutes at 180° F. had gelled to such an extent that a knife blade could not be pushed manually therethrough and moldings could not be produced therefrom.

It has been found that stability testing of premix stabilized polyester molding compositions at elevated temperatures substantially below normal molding temperatures provides a reasonably satisfactory basis for estimating the stability of the premix compositions at room temperature. Estimates of room temperature stability follow the assumption that the rate of deterioration of such premix catalyzed composition diminishes as the temperature is lowered, usually about one-half for every 10° F. lowering of temperature. In general, the stability of premix catalyzed polyester compositions is about twice as great at normal room temperature (70° F.) as at 80° F. temperature, about 30 or more times as great at normal room temperature as at 120° F., and about 2000 or more times as great at normal room temperature as at about 180° F. Stability testing of apparently identical samples at 70° F., 120° F. and 180° F. has confirmed the apparent validity of this estimation method, as stabilities of various premix catalyzed polyester compositions at room temperatures have averaged about 30 times the stabilities obtained at about 120° F. and about 2000 times the stabilities obtained at about 180° F. for the same premix composition.

*Example IV*

Each of the stabilizer combinations employed in Examples I, II, III, was incorporated in a premix plastic stabilized polyester molding composition, sold commercially under the name Glaskyd 1901. Glaskyd 1901, a glass fiber reinforced polyester resin molding compound, supplied in forms ranging from ½" diameter rope up to 2½" diameter log, contains an organic peroxide catalyst, an unsaturated polyester resin and a monomeric vinyl compound polymerizable with the polyester. When compositions containing these stabilizer compositions of the invention were cured at the molding conditions recommended by the supplier, the physical properties of the cured products were substantially the same as the properties of products of Glaskyd 1901 not so stabilized. Trade literature of the supplier has stated the useful life of Glaskyd 1901 to be from one to two months at those temperatures encountered in molding shops. In contrast the compositions of Glaskyd 1901 containing the stabilizer combination of Examples I, II, III were stable for much longer periods of time, with satisfactory moldings being prepared from these compositions after they had been in molding shops for periods as long as 9 to 12 months.

*Example V*

Amounts ranging from about 0.05 to about 0.6 part of stabilizer combinations of the invention consisting of from 25 to 75% of sulphur and from 75 to 25% of each of the following stabilizing substances, which have been taught in the art as effective only in the presence of oxygen, p-benzyl phenol, N-p-tolyl 2-hydroxy-3-naphthamide, 1-(4-sulfo-phenylazo)-2-naphthol, and the dicalcium salt of 1-(4-methyl-2-sulfophenylazo)-2-hydroxy-3-naphtholic acid, when employed in place of the stabilizing composition employed in Example I, in the form of masses of material of greater than about ¼" thickness at room temperature and at elevated temperatures (temperatures less than about 200° F.), provide stabilities for time periods of greater duration than provided by a like composition not stabilized, and by compositions stabilized only with sulphur or only with the oxygen-effective stabilizing substance in amounts less than or equivalent to that amount of the stabilizing combination employed in the particular premix composition. Moreover, the stabilities provided by these compositions containing various stabilizer combinations of the invention were provided with little or no detrimental effect on the cure of the compositions at normal molding temperature and on the cured product therefrom.

Other of the various stabilizer combinations disclosed herein of the invention, when employed in amounts taught herein in compositions comprising various other unsaturated polyester resins, monomeric vinyl substances copolymerizable therewith, polymerization catalysts, and reinforcement materials, also provide premix stabilized polyester molding compositions of exceptional stability at normal room temperature and provide such stability with little or no detrimental effect on the cure of the compositions at normal molding temperatures and on the cured product therefrom.

It will be apparent that various changes and modifications can be made from the specific details discussed above without departing from the true spirit and scope of the attached claims.

What I claim is:

1. A premix stabilized molding composition comprising: an unsaturated polyester resin having carbon to carbon double bonds, a polymerizable monomeric substance having a carbon to carbon double bond and, a stabilizer combination of sulphur and an arylhydroxide stabilizing substance effective as a stabilizer in the presence of oxygen, said arylhydroxide having at least one hydroxyl group and being selected from the class of substituted monohydroxy and poly-hydroxy benzenes, naphthalenes, pyrenes, anthracenes and phenanthracenes which have at least one nuclear substituent which consists at least in part of a monovalent hydrocarbon radical selected from the group consisting of alkyl, alkenyl, aryl, alkaryl, and aralkyl radicals, the stabilizer combination constituting from 0.01 to 0.6 percent by weight of the polyester resin contained in the composition.

2. The composition of claim 1 in which the stabilizer combination is present in an amount of at least 0.1 percent of the polyester resin contained in the composition and in which the amount of sulphur to the amount of arylhydroxide stabilizing substance is within a ratio of from ½ to 1½ parts of sulphur for each part of the arylhydroxide stabilizing substance.

3. A composition of claim 2 in which the arylhydroxide stabilizing substance is ditertiary butyl p-cresol.

4. The composition of claim 2 in which the arylhydroxide stabilizing substance is guaiacol.

5. A premix plastic stabilized unsaturated molding composition comprising from about 65 to about 95 parts of an unsaturated polyester resin having carbon to carbon double bonds, from about 5 to 35 parts of monomeric substance having carbon to carbon double bonds and copolymerizable therewith, an organic peroxide polymerization catalyst in an amount from about 0.5 to 5 percent of the unsaturated polyester in the composition, an inorganic filler, the improvement of from 0.01 to 0.6 percent, based on the weight of unsaturated polyester resin in the composition, of a stabilizer combination consisting of sulphur and an arylhydroxide stabilizing substance effective as a stabilizer in the presence of oxygen, said arylhydroxide having at least one hydroxyl group and being selected from the class of substituted monohydroxy and poly-hydroxy benzenes, naphthalenes, pyrenes, anthracenes and phenanthracenes which have at least one nuclear substituent which consists at least in part of a monovalent hydrocarbon radical selected from the group consisting of alkyl, alkenyl, aryl, alkaryl, and aralkyl radicals.

6. The composition of claim 5 in a mass having a minimum dimension greater than ¼ inch.

7. The composition of claim 6 in which the stabilizer combination is present in an amount of at least 0.1% of the unsaturated polyester resin contained in the composition.

8. The composition of claim 7 in which the amount of sulphur to the amount of arylhydroxide stabilizing substance is within a ratio of from ½ to 1½ parts of sulphur for each part of arylhydroxide stabilizing substance.

9. The composition of claim 8 in which the arylhydroxide stabilizing substance is ditertiary butyl p-cresol.

10. The composition of claim 8 in which the arylhydroxide stabilizing substance is guaiacol.

11. A mass of a minimum dimension of at least ¼ inch of a premix plastic stabilized molding composition comprising: an unsaturated polyester resin having carbon to carbon double bonds; a monomeric vinyl substance having carbon to carbon double bonds and copolymerizable therewith; a polymerization catalyst therefor; and an inorganic filler; said resin, said substance, said catalyst, and said filler in amounts and proportions yielding a plastic mass extrudable at temperatures below normal molding temperatures and moldable at normal molding temperatures to a cured infusible state; and a stabilizer combination consisting of about equal parts of sulphur and a nuclearly substituted arylhydroxide stabilizing substance effective, in the presence of oxygen, as a stabilizer for said composition, said arylhydroxide having at least one hydroxyl group and being selected from the class of substituted mono-hydroxy and poly-hydroxy benzenes, naphthalenes, pyrenes, anthracenes and phenanthracenes which have at least one nuclear substituent which consists at least in part of a monovalent hydrocarbon radical selected from the group consisting of alkyl, alkenyl, aryl, alkaryl, and aralkyl radicals, said stabilizing substance being in an amount sufficient to maintain said composition in a plastic moldable state at room temperature for at least two months and insufficient to affect deleteriously the normal molding conditions and the resulting molded product.

References Cited by the Examiner

UNITED STATES PATENTS

| | | | |
|---|---|---|---|
| 2,632,751 | 3/53 | Anderson | 260—40 |
| 2,852,488 | 9/58 | Clark et al. | 260—45.95 |
| 2,978,434 | 4/61 | Howald | 260—45.7 |
| 2,982,756 | 5/61 | Mercier et al. | 260—45.95 |

MURRAY TILLMAN, *Primary Examiner.*

DANIEL ARNOLD, WILLIAM H. SHORT, *Examiners.*

UNITED STATES PATENT OFFICE
CERTIFICATE OF CORRECTION

Patent No. 3,197,526                           July 27, 1965

Arthur M. Howald

It is hereby certified that error appears in the above numbered patent requiring correction and that the said Letters Patent should read as corrected below.

Column 5, line 41, for "phananthracenes" read -- phenanthracenes --; column 6, line 2, for "arylhydroxide" read arylhydroxides --; line 23, for "butyl-14" read -- butyl-4 --; same column 6, line 24, for "tuluene", both occurrences, read -- toluene --.

Signed and sealed this 18th day of January 1966.

(SEAL)
Attest:

ERNEST W. SWIDER                             EDWARD J. BRENNER
Attesting Officer                                    Commissioner of Patents